US012676827B2

(12) United States Patent　　(10) Patent No.:　US 12,676,827 B2
Kato et al.　　　　　　　　　　(45) Date of Patent:　　　Jul. 7, 2026

(54) COMMUNICATION SYSTEM

(71) Applicant: RISO KAGAKU CORPORATION,
Tokyo (JP)

(72) Inventors: Junko Kato, Tokyo (JP); Tomohiro Hattori, Tokyo (JP)

(73) Assignee: RISO KAGAKU CORPORATION,
Tokyo (JP)

( * ) Notice: Subject to any disclaimer, the term of this patent is extended or adjusted under 35 U.S.C. 154(b) by 56 days.

(21) Appl. No.: 18/884,260

(22) Filed: Sep. 13, 2024

(65) Prior Publication Data

US 2025/0112883 A1　　Apr. 3, 2025

(30) Foreign Application Priority Data

Sep. 28, 2023　(JP) ................................. 2023-166641

(51) Int. Cl.
*G06F 15/16*　　　(2006.01)
*H04L 51/23*　　　(2022.01)
*H04L 51/58*　　　(2022.01)
(52) U.S. Cl.
CPC .............. *H04L 51/23* (2022.05); *H04L 51/58* (2022.05)
(58) Field of Classification Search
CPC ................................ H04L 51/23; H04L 51/58
See application file for complete search history.

(56) References Cited

U.S. PATENT DOCUMENTS

2014/0101068 A1*　4/2014　Gidugu ................ G06Q 50/205
　　　　　　　　　　　　　　　　　　705/327
2015/0312362 A1*　10/2015　Zhao ...................... H04L 67/562
　　　　　　　　　　　　　　　　　　709/219
2018/0144423 A1*　5/2018　Balharith ................ H04L 51/52

FOREIGN PATENT DOCUMENTS

JP　　　2002-221892　　　8/2002

* cited by examiner

*Primary Examiner* — Normin Abedin
(74) *Attorney, Agent, or Firm* — Greenblum & Bernstein, P.L.C.

(57)　　　　　　　ABSTRACT

A communication system includes: a message management server device that accepts communication data sent from a school terminal device, transmits the communication data to a guardian terminal device, and accepts communication data sent from a guardian terminal device, and a bulletin board management server device that accepts communication data sent from the school terminal device, enables the guardian terminal device to view the communication data, but does not accept communication data from the guardian terminal device. It is possible to switch between sending communication data from the school terminal device to the message management server device and from the school terminal device to the message board management server device.

3 Claims, 12 Drawing Sheets

FIG.4

ELEMENTARY SCHOOL A     TEACHER X

MESSAGE DELIVERY/DELIVERY STATUS

| TITLE | DELIVERY STATUS | DELIVERY DATE TIME (SCHEDULED) | DESTINATION CLASS | PREVIEW | NUMBER OF TIMES READ | NUMBER OF PAGES | CREATED DATE TIME | REGISTRANT | DELETE |
|---|---|---|---|---|---|---|---|---|---|
| NOTICE OF CHANGE IN SCHOOL EVENT | DELIVERED | 2022/11/01 15:00:00 | GRADE1 CLASS1 GRADE1 CLASS2 GRADE1 CLASS3 | DISPLAY | CONFIRM | 3 | 2022/11/01 15:00:00 | TEACHER X | DELETE |
| BOARD OF EDUCATION OCTOBER NEWSLETTER | DELIVERED | 2022/11/01 15:00:00 | GRADE1 CLASS1 GRADE1 CLASS2 GRADE1 CLASS3 | DISPLAY | CONFIRM | 1 | 2022/10/01 15:00:00 | TEACHER X | DELETE |
| NOTICE OF ENTRANCE CEREMONY | DELIVERED | 2022/09/01 15:00:00 | GRADE1 CLASS1 | DISPLAY | CONFIRM | 3 | 2022/09/01 15:00:00 | TEACHER X | DELETE |

FIG.7

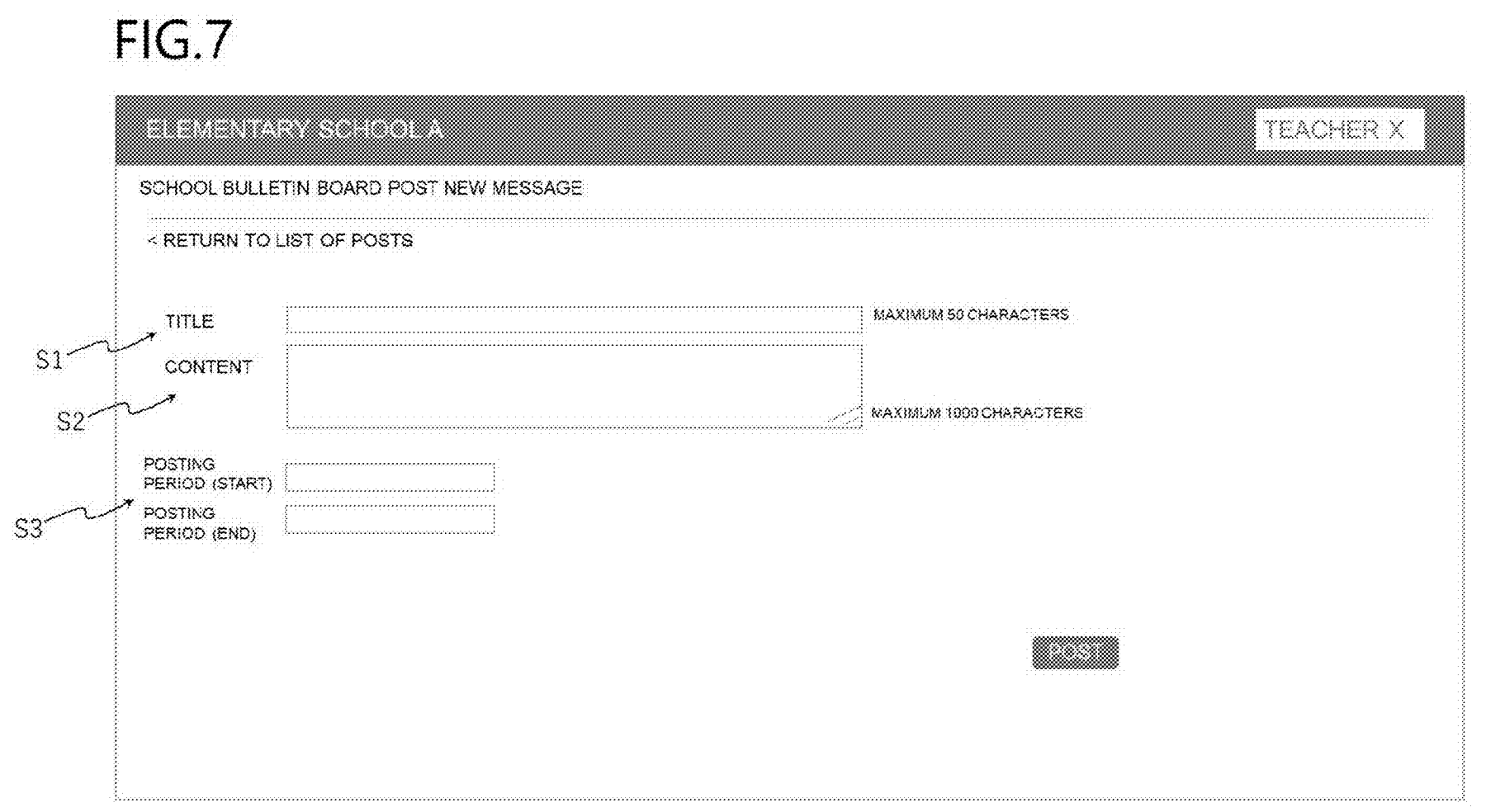

ELEMENTARY SCHOOL X

TEACHER X

SCHOOL BULLETIN BOARD POST NEW MESSAGE

< RETURN TO LIST OF POSTS

TITLE    S1

MAXIMUM 50 CHARACTERS

CONTENT    S2

MAXIMUM 1000 CHARACTERS

POSTING PERIOD (START)    S3
POSTING PERIOD (END)

POST

SCHOOL BULLETIN BOARD

THERE IS A NEW POST

CONFIRM

FIG.12

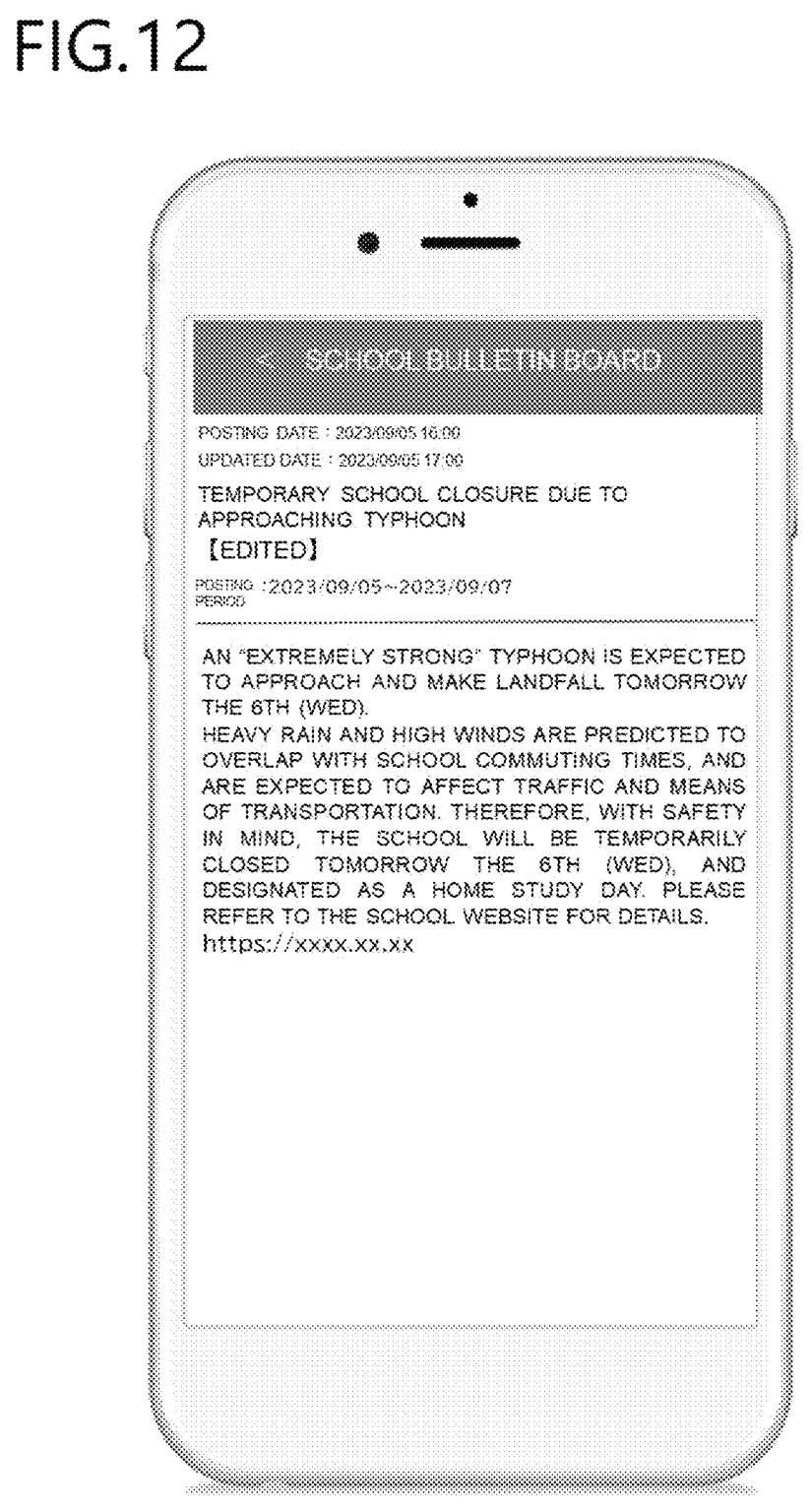

SCHOOL BULLETIN BOARD

POSTING DATE : 2023/09/05 16:00
UPDATED DATE : 2023/09/05 17:00
TEMPORARY SCHOOL CLOSURE DUE TO APPROACHING TYPHOON
【EDITED】
POSTING PERIOD :2023/09/05~2023/09/07

AN "EXTREMELY STRONG" TYPHOON IS EXPECTED TO APPROACH AND MAKE LANDFALL TOMORROW THE 6TH (WED).
HEAVY RAIN AND HIGH WINDS ARE PREDICTED TO OVERLAP WITH SCHOOL COMMUTING TIMES, AND ARE EXPECTED TO AFFECT TRAFFIC AND MEANS OF TRANSPORTATION. THEREFORE, WITH SAFETY IN MIND, THE SCHOOL WILL BE TEMPORARILY CLOSED TOMORROW THE 6TH (WED), AND DESIGNATED AS A HOME STUDY DAY. PLEASE REFER TO THE SCHOOL WEBSITE FOR DETAILS.
https://xxxx.xx.xx

COMMUNICATION SYSTEM

CROSS-REFERENCE TO RELATED APPLICATIONS

The present application claims priority under 35 U.S.C. § 119 to Japanese Patent Application No. 2023-166641, filed on Sep. 28, 2023. The above applications are hereby expressly incorporated by reference, in these entireties, into the present application.

BACKGROUND OF THE INVENTION

1. Field of the Invention

The present disclosure is related to a communication system that sends and receives communication data among terminal devices.

2. Description of the Related Art

Conventionally, technology has been proposed to send and receive messages between a particular organization and terminal devices of those that belong to the organization.

For example, Japanese Unexamined Patent Publication No. 2002-221892 proposes a system for sending and receiving messages between a school and terminal devices of parents/guardians of students that attend the school. Specifically, this document discloses an educational support system having a communication function from the school and a contact function from the parents/guardians/students, and proposes a method for sending and receiving communication data between a terminal device of the school and terminal devices of the parents/guardians/students via a server device.

SUMMARY OF THE INVENTION

In the case that communication data is sent and received among terminal devices via a server device as in the educational support system disclosed in Japanese Unexamined Patent Publication No. 2002-221892, transmissions of communication data from guardians'/students' terminal devices to the server device may be concentrated during emergencies such as natural disasters or crimes, for example. This may cause a communication failure, and the communication function via the server device may become unusable. It would be extremely problematic for the communication function cease when an emergency situation is occurring.

In view of the above circumstances, the present disclosure provides a communication system which is capable of preventing communication failures during emergencies, etc., and ensures a means of communication even during emergency situations.

A communication system of the present disclosure is equipped with a first server device that accepts communication data sent from a first terminal device, transmits the communication data to a second terminal device, and receives communication data sent from the second terminal device, and a second server device that accepts communication data sent from the first terminal device and enables the communication data to be viewable from the second terminal device but does not accept communication data from the second terminal device, in which it is possible to switch between sending of communication data from the first terminal device to the first server device and sending communication data from the first terminal device to the second server device.

According to the communication system of the present disclosure, in addition to the first server device that accepts communication data from the first terminal device and the second terminal device, there is the second server device that accepts communication data sent from the first terminal device and enables the communication data to be viewable from the second terminal device but is not configured to accept communication data from the second terminal device, in which it is possible to switch between sending of communication data from the first terminal device to the first server device and sending communication data from the first terminal device to the second server device. Therefore, communication failures can be prevented during emergencies, for example, by multiple communication means being provided, and a means of communication can be secured.

BRIEF DESCRIPTION OF THE DRAWINGS

FIG. 4 is a diagram that illustrates an example of a message transmission status listes which is displayed on the school terminal device.

FIG. 7 is a diagram that illustrates an example of a bulletin board message creation screen which is displayed on the school terminal device.

FIG. 12 is a diagram that illustrates an example of a detailed message screen which is displayed on a guardian terminal device.

DETAILED DESCRIPTION OF THE EMBODIMENTS

Figure 1:
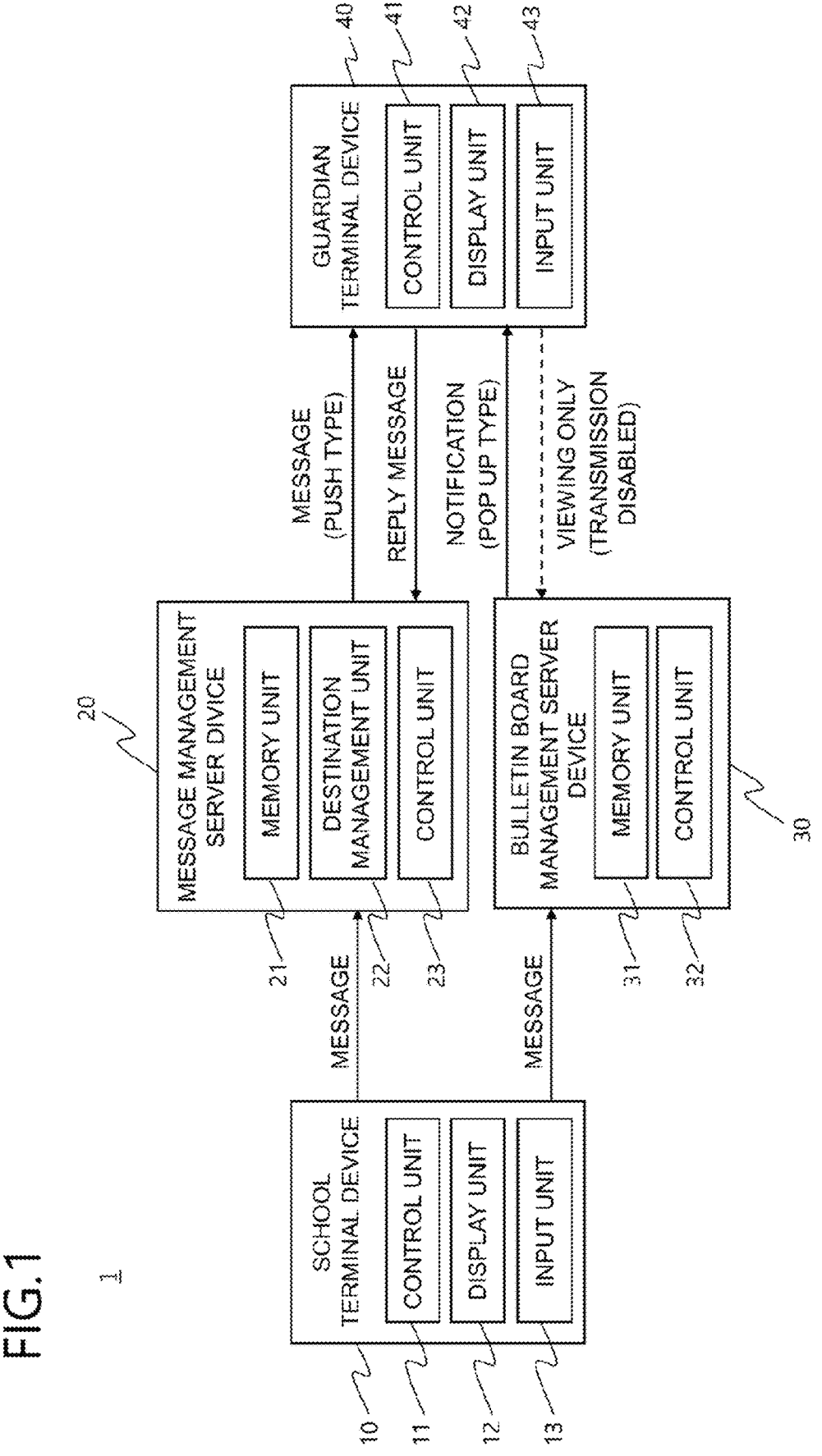
FIG. 1 is a block diagram that illustrates the schematic configuration of a school communication system that employs one embodiment of a communication system of the present disclosure.

A school communication system that employs an embodiment of the communication system of the present disclosure will be described in detail with reference to the attached drawings. FIG. 1 is a block diagram that illustrates the schematic configuration of the school communication system 1.

The school communication system 1 of the present embodiment is a system for sending and receiving communication data between schools and parents and/or guardians (hereinafter, collectively referred to as "guardians"), and is equipped with a school terminal device 10, a message management server device 20, a bulletin board management server device 30, and a guardian terminal device 40. In the present embodiment, the message management server device 20 corresponds to the first server device of the present disclosure, and the bulletin board management server device 30 corresponds to the second server device of the present disclosure. Only one school terminal device 10 is illustrated in FIG. 1. However, the present disclosure is not limited to such a configuration, and a plurality of school terminal devices 10 may be provided. Similarly, a plurality of the guardian terminal device 40 may also be provided.

The school terminal device 10 and the message management server device 20, the message management server device 20 and the guardian terminal device 40, the school terminal device 10 and the bulletin board management server device 30, and the bulletin board management server device 30 and the guardian terminal device 40 are connected by communication lines such as Internet lines, and communications are enabled between each pair of these components.

The school communication system 1 of the present embodiment, under normal circumstances, for example, enables the school to send messages including communication data to guardians and enables the guardians to send messages including communication data to the school. However, during an emergency, for example, the school communication system 1 enables the school to post communication data on an electronic bulletin board and enables guardians to view communication data on the bulletin board, but does not accept messages from guardians to the school.

Hereinafter, each of the devices that constitute the school communication system 1 will be described in detail.

The message management server device 20 accepts messages sent from the school terminal device 10 and sends them to the guardian terminal device 40, and also accepts messages sent from the guardian terminal device 40 and sends these messages to the school terminal device 10.

The message management server device 20 has a memory unit 21 that stores messages sent from the school terminal device 10, a destination management unit 22 that manages destinations and other information of messages sent from the school terminal device 10, and a control unit 23 that controls the entirety of the message management server device 20.

The memory unit 21 has a storage such as a hard disk or a semiconductor memory. In the present embodiment, the memory unit 21 corresponds to a first memory unit of the present disclosure.

The destination management unit 22 is equipped with a table and other information that correlates identification information of the school, identification information of grades in the school, identification information of the class in the grade, identification information of students belonging to the class, and identification information of the guardian terminal devices 40 of the guardians of these students.

The control unit 23 stores messages sent from the school terminal device 10 in the memory unit 21 together with the sources and the destinations of the messages, the dates and times of transmission, etc. Then, based on the destination information added to a message, the control unit 23 refers to a table managed by the destination management unit 22, specifies the identification information of the guardian terminal device 40 to which the message is to be sent, and sends the message to the specified guardian terminal device 40. In other words, the control unit 23 performs so called push type message transmissions to the guardian terminal device 40.

The message management server device 20 also accepts messages sent from the guardian terminal device 40 and sends the messages to the school terminal device 10. Messages which are sent from the guardian terminal device 40 include, for example, a reply message to a questionnaire sent by the school to the guardian terminal device 40, or a message notifying the school of a student's absence.

The memory unit 21 stores messages sent from the guardian terminal device 40, the control unit 23 specifies a school terminal device 10 by referring to the table in the destination management unit 22, and the message from a guardian is sent to the specified school terminal device 10.

As described above, the message management server device 20 is a server device capable of transmitting messages sent from the school terminal device 10 to the guardian terminal device 40, as well as messages sent from the guardian terminal device 40 to the school terminal device 10. That is, message management server device 20 is capable of sending messages in both directions, from the school to the guardian and from the guardian to the school.

The message management server device 20 is equipped with a CPU (Central Processing Unit), a semiconductor memory such as a ROM (Read Only Memory) and a RAM (Random Access Memory), a storage such as a hard disk, a communication I/F (interface), etc.

A message management program, which is a web application, is installed in the storage of the message management server device 20. The sending and receiving of the messages as described above are controlled by the message management program being launched by the CPU.

Note that some or all of the functions which are executed by the message management program may be constituted by hardware such as an ASCI (Application Specific Integrated Circuit), an FPGA (Field-Programmable Gate Array), or other electrical circuits.

In addition, in the present embodiment, the message sending and receiving functions of the school communication system 1 are realized by the message management program described above, a school application, and a guardian application operating in coordination with each other.

Next, the bulletin board management server device 30 will be described.

The bulletin board management server device 30 is a server device that manages the electronic bulletin board, accepts messages sent from the school terminal device 10, and posts these messages on the electronic bulletin board.

The bulletin board management server device 30 has a memory unit 31 that stores messages sent from the school terminal device 10 and a control unit 32 that controls the entirety of the bulletin board management server device 30. In the present embodiment, the memory unit 31 corresponds to a second memory unit of the present disclosure.

The memory unit 31 has a storage such as a hard disk or semiconductor memory and stores messages sent from the school terminal device 10.

The control unit 32 stores messages which are sent from the school terminal device 10 in the memory unit 31, together with the source of the message and the date and time of posting. Then, the control unit 32 posts the message stored in the memory unit 31 onto the electronic bulletin board, accepts access from the guardian terminal device 40, and makes the electronic bulletin board available for viewing.

As described above, the bulletin board management server device 30 posts messages sent from the school terminal device 10 on the electronic bulletin board and makes them available for viewing by the guardian terminal device 40, but does not accept messages from the guardian terminal device 40. In other words, the bulletin board management server device 30 is a server device for unidirectional communication that allows messages posted on the electronic bulletin board to be viewed by the guardian terminal device 40, but does not accept messages from guardians to the school.

In addition, in the present embodiment, in the case that a guardian application to be described below which is installed on the guardian terminal device 40 is launched and a request to view the electronic bulletin board is received from the guardian terminal device 40, if a new message has been posted to the electronic bulletin board since the last time the guardian application was launched, the control unit 32 notifies the guardian terminal device 40 with a message indicating this fact. In other words, the control unit 32 performs so called pop up type notifications.

In the case that the control unit 32 receives a request to view the electronic bulletin board sent from the guardian terminal device 40, it permits access to and viewing of the electronic bulletin board stored in the memory unit 31 without intervention by the web application described above.

The bulletin board management server unit 30 is equipped with a CPU, a semiconductor memory such as a ROM and a RAM, a storage such as a hard disk, a communication I/F, etc.

A bulletin board management program, which is a web application, is installed in the storage of the bulletin board management server device 30. Posting to the electronic bulletin board as described above is controlled by this bulletin board management program being launched by the CPU.

Note that some or all of the functions which are executed by the bulletin board management program may be constituted by hardware such as an ASCI, an FPGA, or other electrical circuits.

In addition, in the present embodiment, the bulletin board function of the school communication system 1 is realized by the bulletin board management program, the school application, and the guardian application described above working in coordination with each together.

The school terminal device 10 is utilized by staff at the school such as teachers, and may be a desktop PC or a notebook PC. However, the present disclosure is not limited to such a configuration, and mobile terminals such as tablet terminals or smartphones may be employed.

The school terminal device 10 is equipped with a control unit 11. The control unit 11 controls the entirety of the school terminal device 10. Particularly, the control unit 11 displays a communication message creation screen which is employed when sending messages from the school to guardians and a bulletin board message creation screen which is employed when posting messages from the school to the electronic bulletin board.

The control unit 11 switches between the transmission of messages from the school terminal device 10 to the message management server device 20 and the transmission of messages from the school terminal device 10 to the bulletin board management server device 30. Specifically, in the present embodiment, server selection information for switching between sending messages to the message management server device 20 and sending messages to the bulletin board management server device 30 is received, and the destination of messages is switched based on the server selection information. Receiving of the server selection information will be described in detail later.

The school terminal device 10 has a display unit 12 such as a liquid crystal display, and a communication message creation screen and bulletin board message creation screen, etc. are displayed on the display unit 12.

The school terminal device 10 also has an input unit 13, such as a mouse or keyboard, which accepts setting inputs to the communication message creation screen and bulletin board message creation screen.

In the case that a tablet terminal or a smartphone is employed as the school terminal device 10, the touch panel of the tablet terminal or smartphone functions as both the display unit 12 and the input unit 13.

The school terminal device 10 is equipped with a CPU, a semiconductor memory such as a ROM and a RAM, storage such as a hard disk, a communication I/F, etc.

A school application is installed in the storage of the school terminal device 10. The communication message creation screen and bulletin board message creation screen are displayed on the school terminal device 10, and various settings are enabled to be entered by the school application being launched by the CPU. Note that a school application provided via a web browser may be utilized instead of utilizing the school application which is installed on the storage device as in the present embodiment.

In addition, some or all of the functions which are executed by the school application may be constituted by hardware such as an ASCI, an FPGA, or other electrical circuits.

The guardian terminal device 40 is utilized by guardians. A mobile terminal such as a smartphone or tablet device, for example, may be employed as the guardian terminal device 40. However, the present disclosure is not limited to such a configuration, and a desktop PC or a notebook PC may be employed as the guardian terminal device 40.

The guardian terminal device 40 is equipped with a control unit 41. The control unit 41 controls the entirety of the guardian terminal device 40. In particular, the control unit 41 displays messages which are sent by the school and the electronic bulletin board.

The guardian terminal device 40 has a display unit 42, such as a liquid crystal display, on which messages sent from the school and the electronic bulletin board are displayed.

The guardian terminal device 40 also has an input unit 43, such as a mouse or keyboard, which accepts setting inputs, such as reply messages from the guardians.

In the case that a tablet terminal or smartphone is employed as the guardian terminal device 40, the touch panel of the tablet terminal or smartphone functions as both the display unit 42 and the input unit 43.

The guardian terminal device 40 is equipped with a CPU, semiconductor memory such as ROM and RAM, a storage such as a hard disk, a communication I/F, etc.

A guardian application is installed in the storage of the guardian terminal device 40. A message viewing screen, a bulletin board viewing screen, a reply message creation screen, etc. are displayed on the guardian terminal device 40 by the guardian application being launched by the CPU, to enable viewing of messages and bulletin boards and input of various settings. Note that a guardian application provided via a web browser may be utilized instead of utilizing the guardian application which is installed on the storage device as in the present embodiment.

Some or all of the functions which are executed by the guardian application may be performed by hardware such as an ASCI, an FPGA, or other electrical circuits.

Next, the flow of processes performed by the school communication system 1 of the present embodiment will be described. First, the process of sending a message from the school to the guardians will be described.

Figure 2:
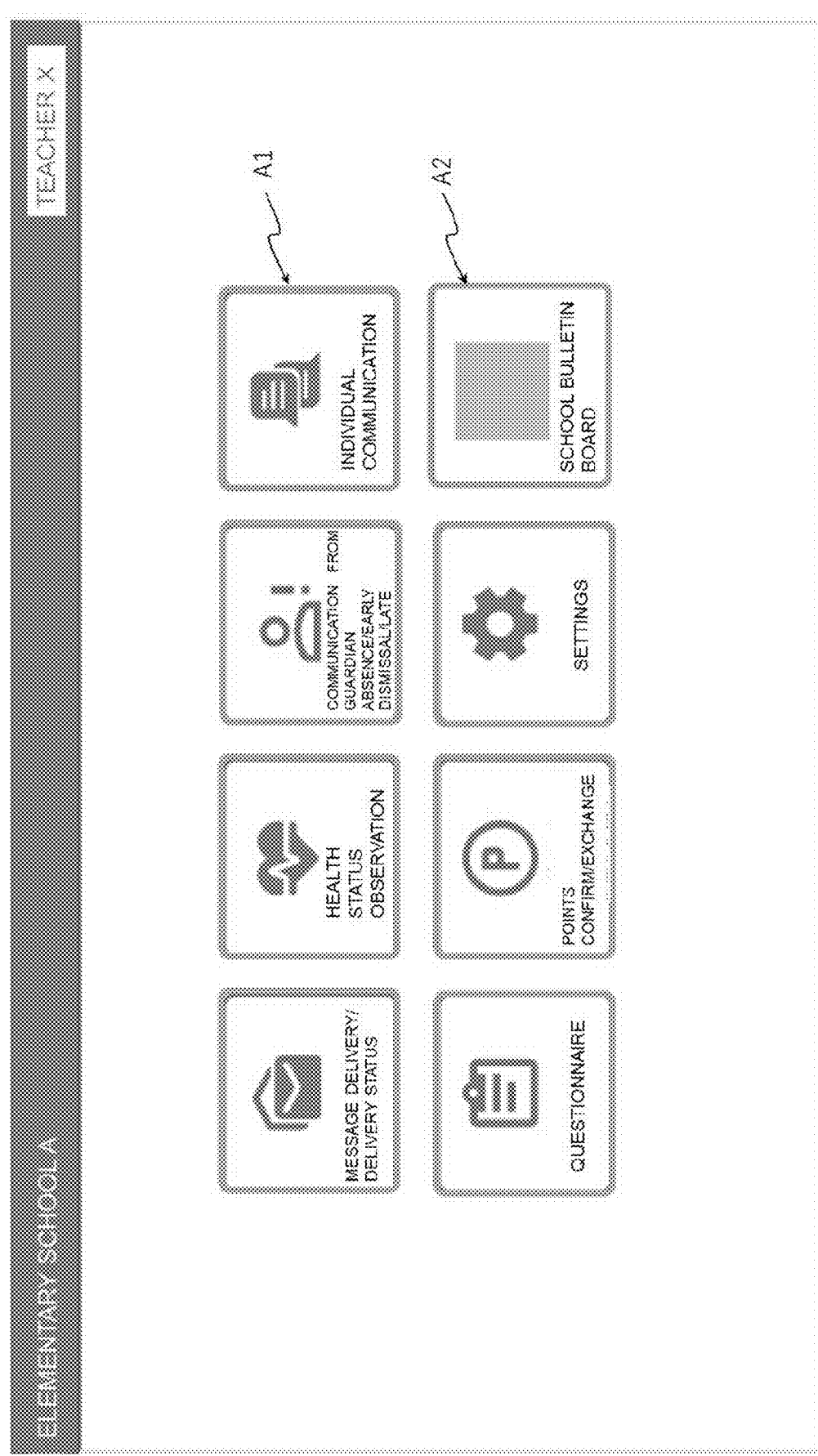
FIG. 2 is a diagram that illustrates an example of a home screen which is displayed on a school terminal device.

First, a school employee (in this case, "Teacher X") launches the school application on the school terminal device 10 and displays a home screen as illustrated in FIG. 2. The home screen displays icons A1 for individual contacts and an icon A2 for a school bulletin board, as illustrated in FIG. 2.

Figure 3:
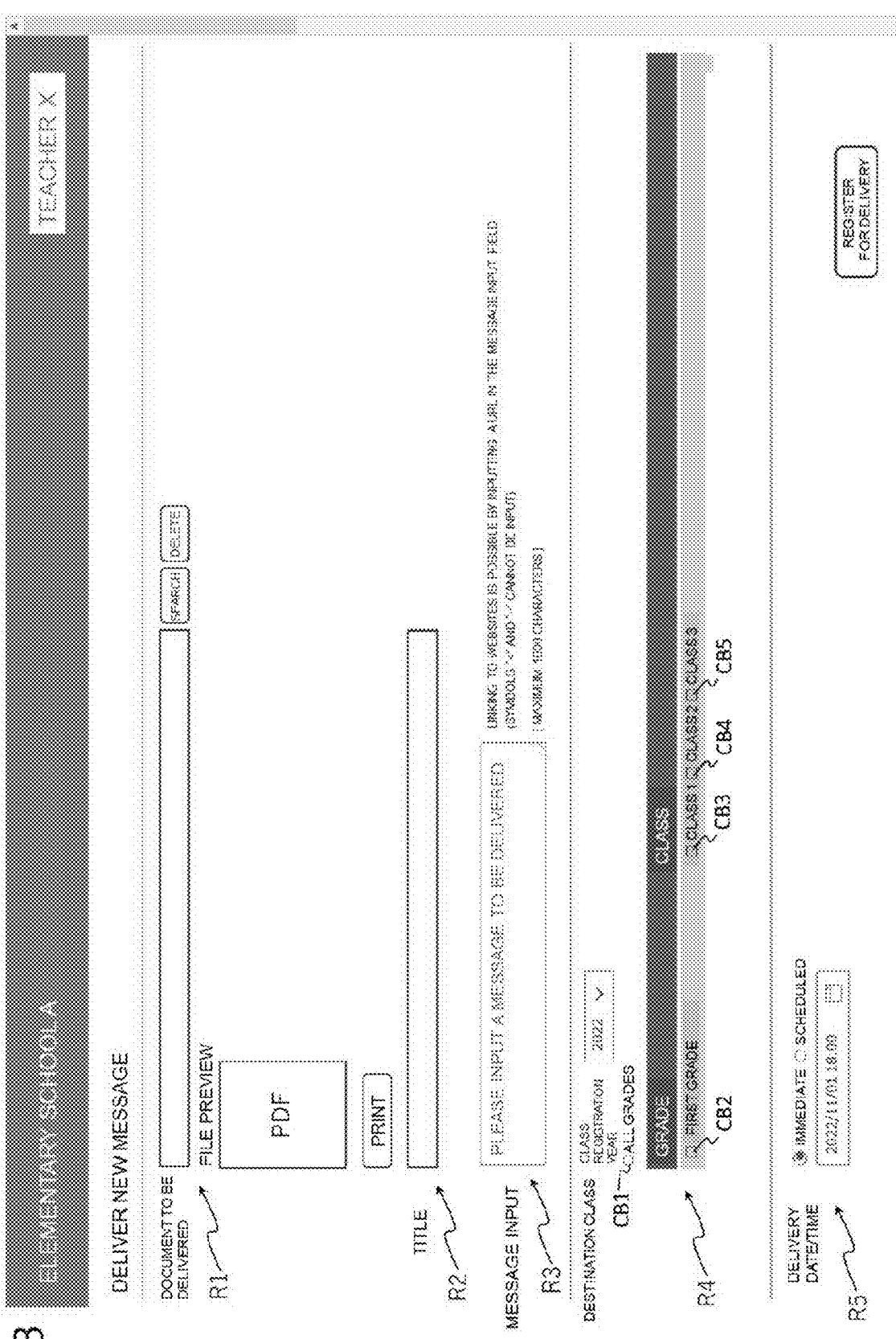
FIG. 3 is a diagram that illustrates an example of a message creation screen displayed on the school terminal device.

When the school sends an individual message to a guardian, the icon A1 for individual contacts illustrated in FIG. 2 is selected. When the icon A1 for individual contacts is selected, the school terminal device 10 displays the message creation screen as illustrated in FIG. 3. In the present embodiment, the selection information of the icon A1 of individual contacts or the icon A2 of the school bulletin board corresponds to the server selection information of the present disclosure.

The message creation screen illustrated in FIG. 3 displays a delivery document selection field R1 for selecting an electronic data file of a document to be delivered, a title input field R2 for accepting entry of a message title, a message input field R3 for accepting entry of a message body, a delivery class selection field R4 for selecting the grade and class to which the message will be delivered, and a delivery date selection field R5 for selecting a delivery date and time.

Necessary information is then set and entered in each of the fields R1 through R4 of the message creation screen. In the delivery class selection field R4, a registration year of a class is selected using a pull down menu, and the grade and class for the selected registration year are also selected. For example, if a message is to be delivered to guardians of students in all grades, the All Grades checkbox CB1 is checked; if the message is to be delivered to guardians of students in all classes of the first grade, the Grade 1 checkbox CB2 is selected; and if the message is to be delivered to guardians of students in a certain class of a grade, checkboxes CB3 through CB5 for classes 1 through 3 are selected.

If the message is to be sent immediately after registration, the "Immediate" radio button in the "Delivery Date and Time" field is selected. If the message is to be sent at a scheduled date and time, the "Schedule" radio button is selected and the date and time at which the message is to be sent is entered.

When the "Register for Delivery" button is selected, the content entered on the message creation screen is transmitted from the school terminal device 10 to the message management server device 20 for registration (storage). The message management server device 20 then transmits the registered message to a destination guardian terminal device(s) 40.

In addition, the school terminal device 10 displays a message transmission status list (message delivery/delivery status) as illustrated in FIG. 4, based on the information registered in the message management server device 20.

As illustrated in FIG. 4, the message transmission status list displays the "Title", "Delivery Status", "(Scheduled) Delivery Date and Time", which is the date and time the message was sent (scheduled for sending) from the school terminal device 10, "Destination Class", "Read Count", "Creation Date and Time" when the message was created (registered), and "Registrant", which is the person who registered the message.

If the "Display" button in the "Preview" column is selected, an electronic data file of a document is opened and displayed as a preview.

Figure 5:
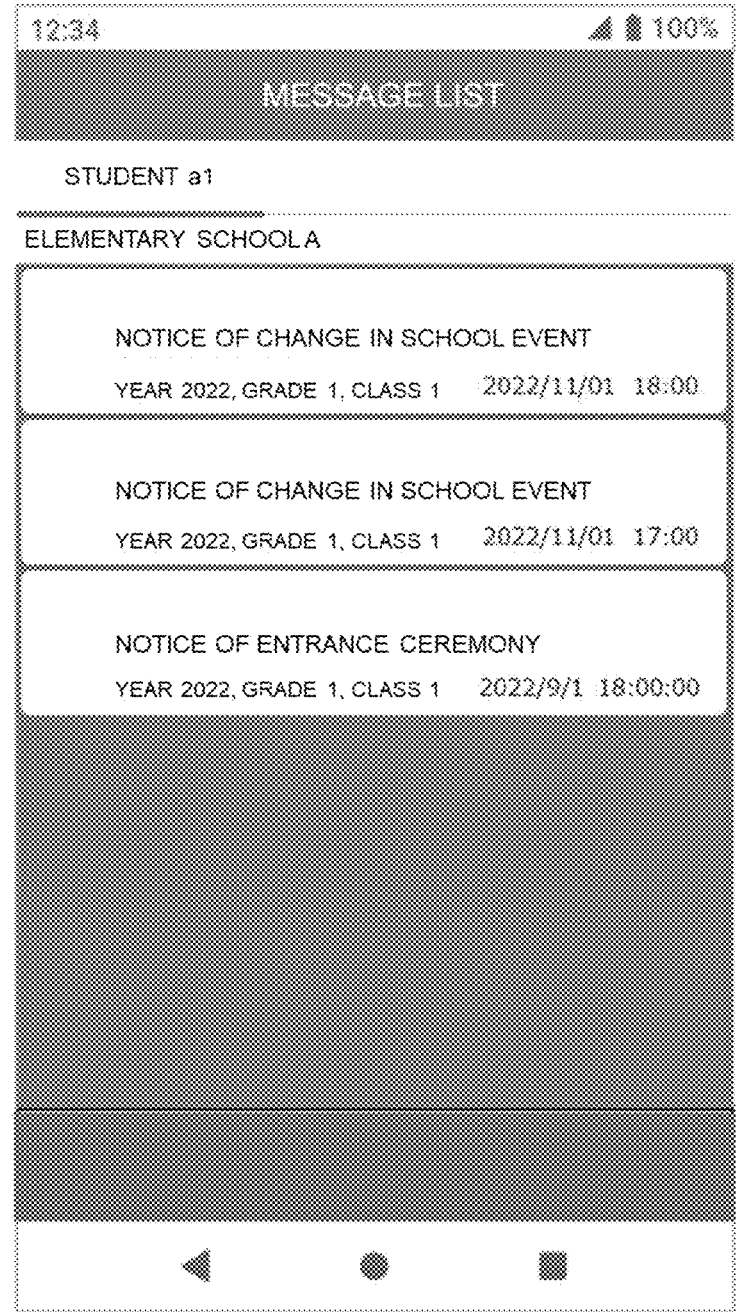
FIG. 5 is a diagram that illustrates an example of a message list screen which is displayed on a guardian terminal device.

After a message is sent to the guardian terminal device 40 as described above, the message list screen illustrated in FIG. 5 is displayed on the guardian terminal device 40, and messages sent from the school terminal device 10 are displayed in a list. In the message list screen illustrated in FIG. 5, if a certain message is selected, the specific contents of that message are displayed, and if an attached file is selected, the screen switches to a detailed message screen, which opens an electronic data file such as a PDF file.

If a message delivered from the school terminal device 10 to the guardian terminal device 40 is a message that requires a response, such as the questionnaire described above, the content of the response is set and entered at the guardian terminal device 40, and a reply message is sent from the guardian terminal device 40 to the message management server device 20, and then from the message management server device 20 to the school terminal device 10.

Next, the process of posting messages on the electronic bulletin board and the process of viewing the posted messages will be explained.

In the case that a message is to be posted on the electronic bulletin board, a school bulletin board icon A2 is selected on the home screen illustrated in FIG. 2. When the school bulletin board icon A2 is selected, the school terminal device 10 displays a school bulletin board history list screen such as that illustrated in FIG. 6.

Figure 6:
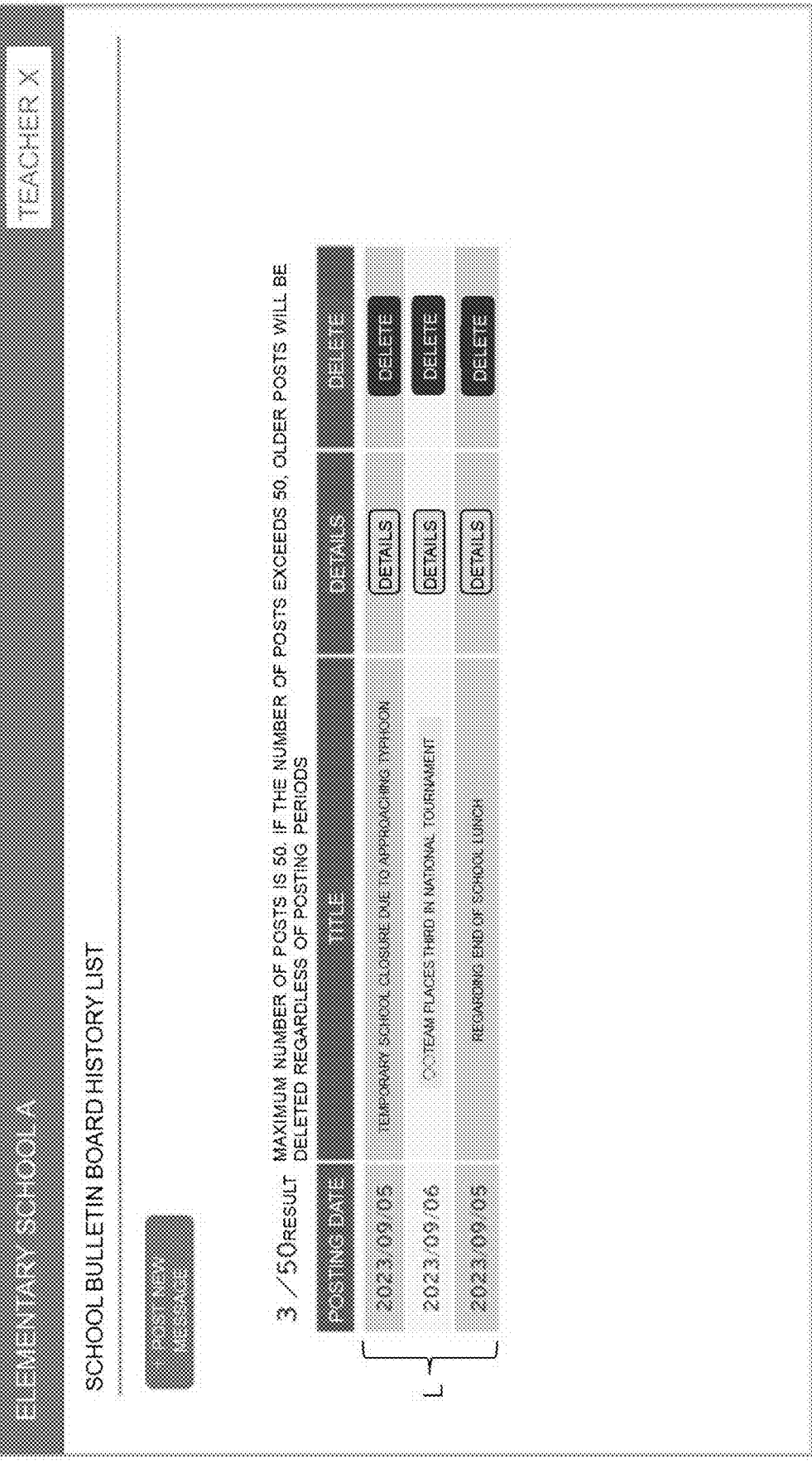
FIG. 6 is a diagram that illustrates an example of a school bulletin board history list screen which is displayed on the school terminal device.

The school bulletin board history list screen illustrated in FIG. 6 displays a message list column L that have been posted to the electronic bulletin board in the past. The posting date, message title, detail button, and delete button are displayed in the message list column L for each message.

The school bulletin board history list screen illustrated in FIG. 6 also displays a new post button for posting a new message. When the new post button is selected, the bulletin board message creation screen illustrated in FIG. 7 is displayed. The bulletin board message creation screen illustrated in FIG. 7 displays a title input field S1 that accepts entry of a message title, a message input field S2 that accepts entry of the body of a message, and a posting period input field S3 that accepts entry of a posting period (start and end).

When the "Post" button illustrated in FIG. 7 is selected after input is completed in each field of the bulletin board message creation screen, the contents that were input on the bulletin board message creation screen are registered (stored) from the school terminal device 10 to the bulletin board management server device 30 and posted on the electronic bulletin board. The message is then newly added to the message list column L on the school bulletin board history list screen illustrated in FIG. 6.

Figure 8:
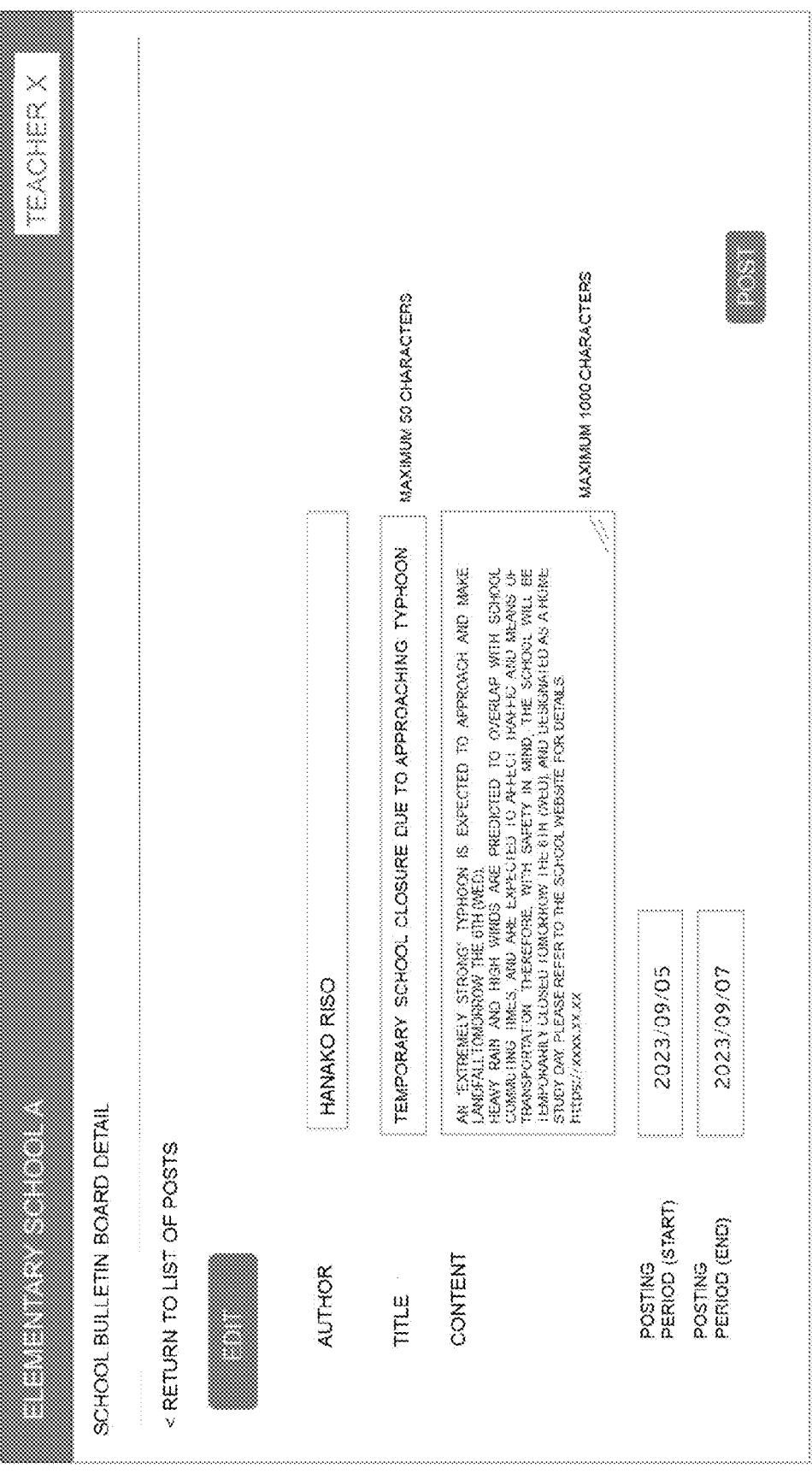
FIG. 8 is a diagram that illustrates an example of a school bulletin board detail screen which is displayed on a school terminal device.

When the detail button for a certain post in the message list column L on the school bulletin board history list screen is selected, the school bulletin board detail screen illustrated in FIG. 8 is displayed, and the detailed content of the posted message is displayed. When the "Edit" button on the school bulletin board detail screen illustrated in FIG. 8 is selected, the contents of a message can be edited, and when the "Post" button is selected after editing, the edited contents are posted on the electronic bulletin board.

In the case that a guardian wishes to view a message posted on the electronic bulletin board, the guardian application is launched on the guardian terminal device 40. If no new messages have been posted to the electronic bulletin board since the last time the guardian application was launched, that is, if the electronic bulletin board has not been updated between the last time the guardian application was launched and the present, the home screen illustrated in FIG. 9 is displayed.

Figure 10:
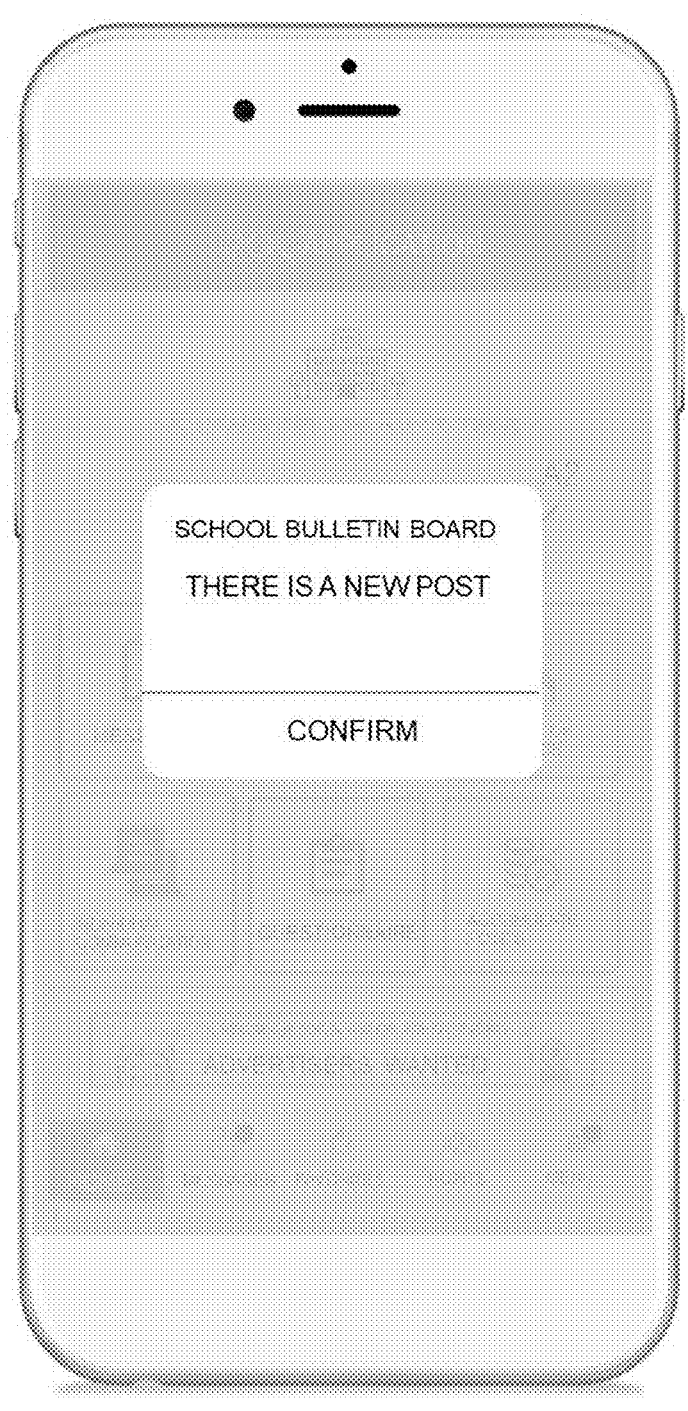
FIG. 10 is a diagram that illustrates an example of a popup type notification which is displayed on the guardian terminal device.

In contrast, if a new message has been posted to the electronic bulletin board between the last time the guardian application was launched and the present, that is, if the electronic bulletin board has been updated between the last time the guardian application was launched and the present, the "There is a new post" notification is displayed, as illustrated in FIG. 10.

Figure 9:
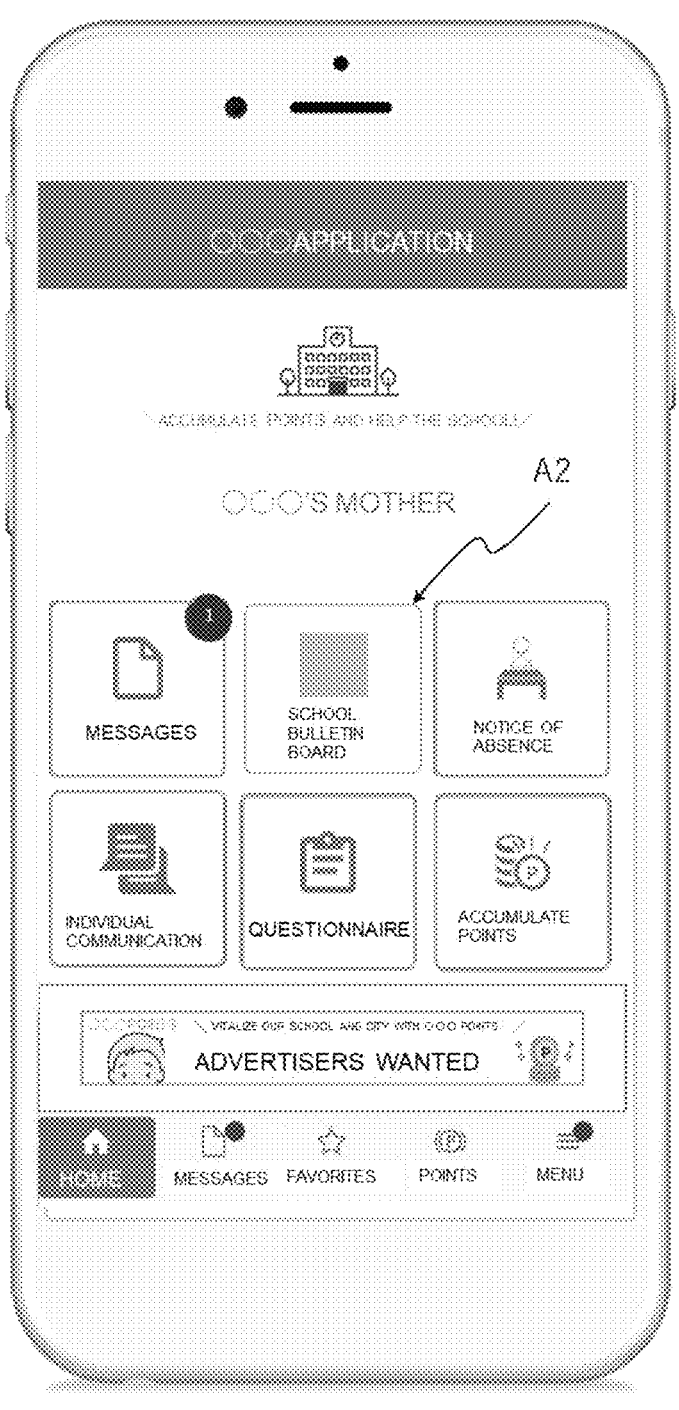
FIG. 9 is a diagram that illustrates an example of a home screen which is displayed on a guardian terminal device.
Figure 11:
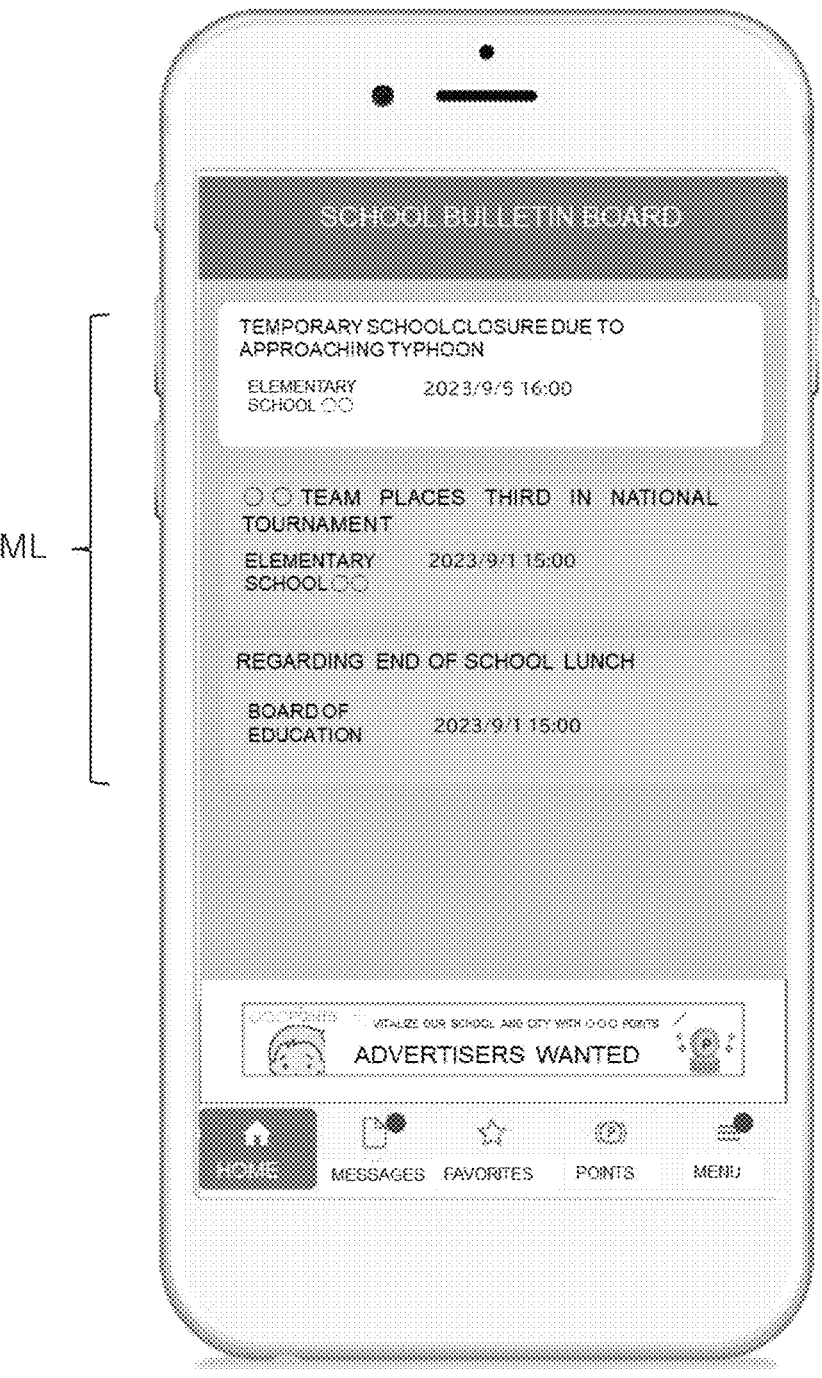
FIG. 11 is a diagram that illustrates an example of a bulletin board screen which is displayed on a guardian terminal device.

In the case that the school bulletin board icon A2 on the home screen illustrated in FIG. 9 is selected, or in the case that the "Confirm" button illustrated in FIG. 10 is selected, the bulletin board screen illustrated in FIG. 11 is displayed on the guardian terminal device 40.

The bulletin board screen illustrated in FIG. 11 displays a message list column ML posted on the electronic bulletin board. In the message list column ML, the title of the message posted on the electronic bulletin board, the poster, and the date and time of posting are displayed.

In the case that one of the messages in the message list column ML on the bulletin board screen illustrated in FIG. 11 is selected, the message details screen illustrated in FIG. 12 is displayed, and the contents of the body of the message are displayed.

According to the school communication system 1 of the above embodiment, in addition to the message management server device 20 that accepts communication data from the school terminal device 10 and the guardian terminal device 40, there is a bulletin board management server device 30 that does not accept communication data from the guardian terminal device 40. The transmission of communication data from the school terminal device 10 to the message management server device 20 and the transmission of communication data from the school terminal device 10 to the bulletin board management server device 30 can be switched, such that communication failures can be prevented by preparing multiple means of communication, which are the message management server device 20 and the bulletin board management server device 30. This enables a means of communication to be secured even during an emergency.

In addition, the school communication system 1 of the above embodiment switches between sending messages to the message management server device 20 and the bulletin board management server device 30 based on the server selection information set in the school terminal device 10. Therefore, it is possible to switch the destination of messages as appropriate according to the situation.

In the school communication system 1 of the above embodiment, the bulletin board management server device 30 enables the guardian terminal device 40 to view the communication data stored in the memory unit 31 by directly accessing the memory unit 31 without a web application. This reduces the load on the bulletin board management server device 30, thereby making communication failures less likely to occur.

In the school communication system 1 of the above embodiment, the message management server device 20 sends push type messages to the guardian terminal device 40 when a new message is sent from the school terminal device 10, and the bulletin board management server device 30 sends a pop up notification when there is a new post on the electronic bulletin board. Thereby, the message board management server device 30 can decrease the volume of communication between the message board management server device 30 and the guardian terminal device 40 and thus reduce the likelihood of communication failures.

The present disclosure is not limited to the above embodiment, but may be embodied by transforming the components to an extent that does not depart from the spirit of the disclosure at the implementation stage. In addition, various inventions can be formed by appropriately combining the plurality of components disclosed in the above embodiment. For example, all of the components disclosed in the embodiment may be combined as appropriate. It is, of course, possible to make various modifications and applications within a scope that does not depart from the purpose of the present disclosure.

The items below are further disclosed with respect to the present disclosure.

(Item 1)

The communication system of the present disclosure is equipped with a first server device that accepts communication data sent from a first terminal device, transmits the communication data to a second terminal device, and accepts communication data sent from the second terminal device, and a second server device that accepts communication data sent from the first terminal device, makes the communication data viewable from the second terminal device, but does not accept communication data from the second terminal device. Transmission of communication data from the first terminal device is switchable between transmission from the first terminal device to the first server device and transmission from the first terminal device to the second server device.

(Item 2)

In the communication system of Item 1, the transmission of communication data from the first terminal device to the first server device and the transmission of communication data from the first terminal device to the second server device may be switched based on server selection information which is set in the first terminal device.

(Item 3)

In the communication system of Item 1 or Item 2, the first server device has a first memory unit that stores communication data transmitted from the first terminal device, and the communication data stored in the first memory unit is read by a web application of the first server device and transmitted to the second terminal device, and the second server device has a second memory unit that stores the communication data transmitted from the first terminal device, and the second terminal device can view the communication data stored in the second memory unit by directly accessing the second memory unit, without going through a web application of the second server device.

(Item 4)

In the communication system of any of Items 1 through 3, in the case that the first server device accepts new communication data sent from the first terminal device, the first server device sends the new communication data to the second terminal device in response to accepting the new communication data, and in the case that the second server device accepts new communication data sent from the first terminal device, the second server device notifies the second terminal device of the new communication data in response to a request from the second terminal device.

What is claimed is:

1. A communication system comprising:
   a first server device that accepts communication data sent from a first terminal device, transmits the communication data to a second terminal device, and accepts communication data sent from the second terminal device; and a second server device that accepts communication data sent from the first terminal device, makes the communication data viewable from the second terminal device, but does not accept communication data from the second terminal device;

transmission of communication data from the first terminal device being switchable between transmission from the first terminal device to the first server device and transmission from the first terminal device to the second server device, wherein:

the first server device has a first memory unit that stores communication data transmitted from the first terminal device; and the communication data stored in the first memory unit is read by a web application of the first server device and transmitted to the second terminal device;

the second server device has a second memory unit that stores the communication data transmitted from the first terminal device; and the second terminal device can view the communication data stored in the second memory unit by directly accessing the second memory unit, without going through a web application of the second server device.

2. The communication system as defined in claim 1, wherein:

the transmission of communication data from the first terminal device to the first server device and the transmission of communication data from the first terminal device to the second server device is switched based on server selection information which is set in the first terminal device.

3. The communication system as defined in claim 1, wherein:

in the case that the first server device accepts new communication data sent from the first terminal device, the first server device sends the new communication data to the second terminal device in response to accepting the new communication data; and in the case that the second server device accepts new communication data sent from the first terminal device, the second server device notifies the second terminal device of the new communication data in response to a request from the second terminal device.

* * * * *